United States Patent Office 3,297,591
Patented Jan. 10, 1967

---

3,297,591
PROCESS FOR THE PREPARATION OF α-PERFLUORO-p-XYLYLENE POLYMERS
Sui-Wu Chow, Bridgewater Township, Somerset County, N.J., assignor to Union Carbide Corporation, a corporation of New York
No Drawing. Filed July 9, 1964, Ser. No. 381,528
6 Claims. (Cl. 260—2)

This invention is a continuation-in-part of prior application bearing Serial No. 310,929 filed September 23, 1963, now abandoned.

This invention relates to a process for the preparation of α-perfluoro-p-xylylene polymers.

The outstanding physical properties of the paraxylylene polymer family have prompted extensive efforts to enable their convenient preparation. Although these polymers have excellent thermal and chemical stability, the presence of —CH$_2$— groups adjacent to the aromatic ring provide potentially vulnerable sites for atmospheric attack. In order to strengthen these vulnerable positions, it has been found desirable to replace the active hydrogen atoms with more stable substituent groups such as fluorine.

Heretofore, it was possible to prepare α-perfluoro-p-xylylene polymers by the pyrolytic recomposition of a compound having the general structure

wherein R is an alkyl group having from about 1–6 carbon atoms. This method, however, resulted in the evolution of sulfur dioxide and other gaseous materials resulting in pressure fluctuations and by-products which complicate the deposition of the polymer.

Now, it has been found that α-perfluoro-p-xylylene polymers can be prepared by the pyrolysis of halogen substituted α-tetrafluoro-p-xylenes and 1,2-bis(α-halodifluoro-p-tolyl)-tetrafluoroethanes.

Accordingly, it is an object of this invention to provide a method which enables the use and selection of more conveniently obtainable precursors than heretofore possible.

Another object of this invention is to provide new linear dimers and other precursors which are employed in obtaining poly(α-perfluoro-p-xylylene).

These are further objects will become apparent from the ensuing discussion.

According to the present invention, it has now been found that linear polymers of α-perfluoro-p-xylylene can be produced by the pyrolysis of a compound having the general formula:

wherein n is an integer from 1 to 2 inclusive, Y is a halogen having a lower bond strength than fluorine, Y′ is a member selected from the group consisting of hydrogen and halogens having a lower bond strength than fluorine, to form reactive intermediary diradical species having the general structure

and cooling and condensing the thus formed diradicals to a temperature below 200° C. to form an α-perfluoro-p-xylylene polymer.

The α-perfluoro-p-xylene precursor compound having the formula

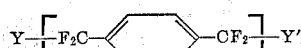

wherein n has a value of 1 and Y and Y′ are as defined above, can be prepared from known α,α,α′,α′-tetrafluoro-p-xylenes by halogenating said tetrafluoro-p-xylene with a halogen having a bond strength no greater than the fluorine already present in the alpha position. For example, if α,α,α′,α′-tetrafluoro-p-xylenes are employed, halogens, such as chlorine, bromine, or iodine can be employed in the Y and/or Y′ positions since they have a lower bond strength than fluorine.

When n has a value of 2, these α-tetrafluoro-p-xylenes may also be designated as 1,2-bis(α,α-difluoro-p-tolyl) tetrafluoroethanes. Upon halogenation, these new compounds are termed 1,2-bis(α-halo-α,α-difluoro-p-tolyl) tetrafluoroethanes. Halogenation of these α-tetrafluoro-p-xylenes is accomplished in the same manner as described immediately hereinabove.

When the α-perfluoro-p-xylene having the structure

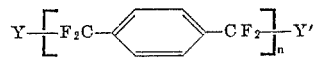

wherein n has a value of 2, and Y and Y′ are as above, are utilized to obtain the α-perfluoro-p-xylylene polymers, they may be conveniently prepared by halogenating 1,2-bis(α,α-difluoro-p-tolyl)tetrafluoroethane. The required 1,2-bis(α,α-difluoro-p-tolyl)-tetrafluoroethane may be prepared by dissolving 1,2-di(p-tolyl)-tetrafluoroethane in a solution of acetic acid, acetic anhydride and a strong mineral acid. Generally, any strong mineral acid may be used; such as concentrated sulfuric acid, hydrochloric acid, phosphoric acid, sulfonic acid and so forth. This solution is then cooled to a temperature of between about 0° C. to 10° C. Good results are obtained when the solution is cooled to a temperature of between about 0° C. to 5° C., and this temperature range is preferred. To the cooled solution is slowly added an oxidizing agent. Normally, any oxidizing agent may be used which is capable of oxidizing the 1,2-di(p-tolyl tetrafluoroethane to the aldehyde stage. Generally, tertiary butyl chromates, chromium trioxide, and the like are satisfactory oxidizing agents for this purpose.

The oxidized solution is then poured into ice water and the resultant product is isolated by filtration, washed with water and dissolved in an organic solvent. The organic solvent employed should be selected from the group of organic solvents which are capable of acting as solvents when hot but which will release the solute when cold. Among the organic solvents which may be utilized are hexane, ethyl alcohol, isopropyl, heptane and the like.

Recrystallization of the solute from the organic solvent will yield 1,2-bis(α,α-diacetoxy-p-tolyl)tetrafluoroethane.

The 1,2-bis(α,α-diacetoxy-p-tolyl)tetrafluoroethane is fluorinated to obtain the 1,2-bis(α,α-difluoro-p-tolyl)-tetrafluoroethane. This is accomplished by mixing it with sulfur tetrafluoride and heating. The resulting product is freed from acidic by-products by washing with water to obtain 1,2-bis(α,α-difluoro-p-tolyl)tetrafluoroethane which is further purified by recrystallization from an organic solvent.

The 1,2-bis(α,α-difluoro-p-tolyl)tetrafluoroethane may now be halogenated in the same manner as described hereinabove. These halogenation reactions have been found to proceed well when a mixture of either of the above p-xylene precursors, a halogenating agent, such as gaseous chlorine, N-bromo-succinimide, and the like, and a suitable inert organic solvent are irradiated with ultraviolet light while the mixture is maintained at the reflux temperature of the solvent. However, it should be understood that, while this halogenating process is preferred, other halogenating techniques can also be successfully employed.

These new 1,2 - bis(α - halo-α,α-difluoro-p-tolyl)tetrafluoroethanes have been found to be particularly useful precursors in forming the poly(α-perfluoro-p-xylylene) compounds of the instant invention. They have also been found to be useful precursors in forming cyclo(di-p-xylene) and p-xylene compounds as well.

Additionally, these new compounds; that is, 1,2-bis-(α,-halo-α,α-difluoro-p-tolyl)tetrafluoroethane, 1,2 - bis-(α,α - difluoro - p - tolyl)tetrafluoroethane, and 1,2-bis-(α,α - diacetoxy - p - tolyl)tetrafluoroethane, may also be employed as lubricants in relatively high temperature reaction systems since they have been found to exhibit good thermal stability at temperatures of between about 150° C.–500° C.

In the pyrolytic polymerization process of the instant invention, the reactive intermediary diradical species are prepared by pyrolyzing, at a temperature of between about 700° C and 1000° C. and preferably at temperatures of between about 750° C. and 950° C., a compound having the basic structure:

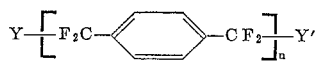

wherein $n$ is an integer from 1 to 2 inclusive, and Y and Y' are as defined above. At such temperatures, essentially quantitative yields of the reactive diradicals are secured. Employing temperatures of about 700° C. or below serves only to increase the reaction time and decrease the yield of polymer to a negligible amount. At temperatures above 1000° C. cleavage of the substituent groups can occur, resulting in a tri- or polyfunctional species causing cross-linking or highly branched polymers to form.

Pyrolysis temperature is essentially indepedent of the operating pressure. It is, however, preferred that reduced or subatmospheric pressure be employed. For most operations, pressures within the range of 0.0001 to 10 mm. Hg absolute are most practical. However, if desired, greater pressures can be employed. Likewise, if desirable, inert vaporous diluents such as nitrogen, argon, carbon dioxide and the like may be employed to vary the optimum temperature of the pyrolysis or to change the total effective pressure in the system.

In the polymerization process, the intermediary diradical species condense and polymerize nearly instantaneously at the condensation temperature of the diradicals. The coupling of these diradicals involves such low activation energy and the chain propagation shows little or no preference as to the particular diradical; that steric and electronic effects are now important as they are in vinyl polymerization. Thus α-perhalo-p-xylylene homopolymers can be made by cooling the diradicals down to any temperature below the condensation temperature of the diradical. It has been observed that for each diradical species, there is an optimum ceiling condensation temperature above which the diradical will not condense and polymerize. All observed ceilings of α- and ring substituted p-xylylene diradicals have been below 200° C. but vary to some degree upon the operating pressure involved. For example, at 0.5 mm. Hg pressure, the following condensation and polymerization ceilings are observed for the following diradicals:

| | ° C. |
|---|---|
| p-Xylylene | 25–30 |
| α-Perfluoro-p-xylylene | 30–40 |
| 2-chloro-p-xylylene | 70–80 |
| 2-cyano-p-xylylene | 120–130 |
| 2-n-butyl-p-xylylene | 130–140 |
| 2-iodo-p-xylylene | 180–200 |

Thus, by this process, homopolymers are made by maintaining the substrate surface at a temperature below the ceiling condensation temperature of the particular diradical specie involved, or desired, in the homopolymer. This is most appropriately termed "homopolymerizing condition."

Where several different diradicals are formed by pyrolyzing a mixture of precursor compound as described above, and said diradicals have different vapor pressure and condensation characteristics, as for example, α-perfluoro-p-xylylene and a substituted p-xylylene species or any other mixture with other substituted diradicals, homopolymerization will result when the condensation and polymerization temperature is selected to be at or below that temperature where only one of the diradicals condense and polymerize. Thus, for purposes within this application, the term "under homopolymerization conditions" is intended to include those conditions where only homopolymers are formed. Therefore it is possible to make homopolymers from a mixture containing one or more of the substituted diradicals when any other diradicals present have different condensation or vapor pressure characteristics, and wherein only one diradical specie is condensed and polymerized on the substrate surface. Of course, other diradical species not condensed on the substrate surface can be drawn through the system, in vaporous form, to be condensed and polymerized in a subsequent cold trap.

It is also possible to obtain α-perfluoro-p-xylylene copolymers through the pyrolysis process described hereinabove. Copolymers of α-perfluoro-p-xylylene and substituted α-perfluoro-p-xylylene diradicals, as well as copolymers of substituted α-perfluoro-p-xylylene diradicals wherein the substituted groups are all the same diradicals but wherein each diradical contains a different number of substituents groups, can all be obtained through the said pyrolysis process. Moreover, it is also possible to obtain copolymers of α-perfluoro-p-xylylene and other p-xylylene species having no α-substitution such as p-xylylene and those ring-substituted species whose condensation temperatures are listed above. Copolymerization is also possible with different α-perhalogenated species.

Copolymerization occurs simultaneously with condensation upon cooling of the vaporous mixture of reactive diradicals to a temperature below about 200° C. under polymerization conditions. Copolymers can be made by maintaining the substrate surface at a temperature below the ceiling condensation temperature of the lowest boiling diradical desired in the copolymers, such as at room temperature or below. This is considered "copolymerizing conditions," since at least two of the diradicals will condense and copolymerize in a random copolymer at such temperature.

The polymers can be readily recovered from the polymerization zone by any convenient means, depending on the particular zone employed. Where a cold surface, such as a condenser is employed as the polymerization zone, the polymer can be removed from the wall of the zone by mechanical stripping or other suitable means. Condensation of the diradical in a water sprayer or under the surface of an aqueous medium recovers the polymer in particulate form, which can then be separated by filtration and drying by conventional means prior to fabrication.

The following examples are illustrative of the present invention but are not intended to be construed as limitative thereof. Unless otherwise specified, all percentages and parts are by weight.

EXAMPLE I

*Preparation of α,α'-dibromo-α,α,α',α'-tetrafluoro-p-xylene*

α,α,α',α'-Tetrafluoro-p-xylene was prepared by the method of Hasek et al., J. Am. Chem. Soc. 82, 543 (1960), by the reaction of terephthaldehyde with sulfur tetrafluoride at temperatures of about 150° C.

0.15 moles of α,α,α',α'-tetrafluoro-p-xylene as prepared above was admixed with 0.33 moles of N-bromosuccinimide and 320 parts of carbon tetrachloride. The mixture was irradiated with an ultraviolet lamp while maintained at the reflux temperature of the solvent. The precipitated succinimide was removed by filtration and the filtrate was distilled to give 0.12 moles of α,α'-dibromo-α,α,α',α'-tetrafluoro-p-xylene having a boiling point of 102–107° C. at 25 mm. Hg.

The compound was subjected to infrared analysis which showed the characteristic —CF₂— absorptions at 9.2 and 9.4 microns. The presence of the bromine substituents was confirmed by elemental analysis and by hydrolysis of the compound to terephthalic acid with silver acetate in aqueous acetic acid solution.

EXAMPLE II

*Preparation of α,α'-dichloro-α,α,α',α'-tetrafluoro-p-xylene*

A solution of 10.7 grams of α,α,α',α'-tetrafluoro-p-xylene in 100 milliliters of carbon tetrachloride was irradiated with an ultraviolet lamp. The solution was maintained at the reflux temperature of the solvent by the heat of the ultraviolet lamp. Chlorine was passed into the solution until the color of the chlorine remained in the solution which amounted to about 9 grams of chlorine. Irradiation was continued for an additional 30 minutes. The excess chlorine was purged from the solution by a stream of argon. Distillation of the reaction solution gave 11.6 grams of α,α'-dichloro-α,α,α',α'-tetrafluoro-p-xylene having a boiling point of 86–90° C. at 34 millimeters Hg.

The compound was subjected to infrared analysis which showed the characteristic —CF₂— absorptions at 9.2 and 9.4 microns. The presence of the chlorine substituents was confirmed by hydrolysis of the compound to terephthalic acid with silver acetate in aqueous acetic acid solution.

EXAMPLE III

*Pyrolysis of α,α'-dichloro-α,α,α'α'-tetrafluoro-p-xylene*

α,α'-Dichloro-α,α,α',α'-tetrafluoro-p-xylene as prepared in Example II was charged to a quartz pyrolysis tube in the gaseous state by means of sublimation at less than 50° C. under reduced pressure. The quartz pyrolysis tube was maintained at 800° C. to 950° C. by a high temperature furnace surrounding said tube. The pyrolysis tube led into a water cooled condenser and a Dry Ice-acetone cooled receiver. The entire system was maintained under a reduced pressure of less than 0.1 millimeters Hg. The hot pyrolysate formed during pyrolysis was cooled by passage through the water cooled condenser and condensed on the walls to form a polymeric film of poly(α-perfluoro-p-xylylene) which could be mechanically stripped from the glass surface. Comparison of the infrared spectra of the film with that of a standard obtained by pyrolysis of an α,α'-bis(alkylsulfonyl) α,α,α',α'-tetrafluoro-p-xylene showed that they were superimposable and thus identical.

EXAMPLE IV–IX

*Preparation of poly(α,α,α',α'-tetrafluoro-p-xylylene)*

Table I presented hereinbelow illustrates the preparation of poly(α,α,α',α'-tetrafluoro-p-xylylene) or as it is also called poly(α-perfluoro-p-xylylene) in a manner similar to that described in Example III above.

TABLE I

| Y—F₂C—⟨ ⟩—CF₂—Y' | Vaporization Temp. (° C.) | Pressure (mm. Hg.) | Pyrolysis Temp. (° C.) |
|---|---|---|---|
| Example IV, Y=Y'=Br | 50 | 0.05 | 900 |
| Example V, Y=Y'=Br | 50 | 0.03 | 850 |
| Example VI, Y=Y'=Br | 50 | 0.05 | 850 |
| Y=Br, Y'=H | 50 | 0.05 | 850 |
| Example VII, Y=Y'=Cl | 50 | 0.05 | 850 |
| Example VIII, Y=Y'=Cl | 50 | 0.05 | 800 |
| Example IX, Y=Y'=Cl | 50 | 0.05 | 950 |
| Y=Cl, Y'=H | 50 | 0.05 | 950 |

EXAMPLE X

*Preparation of 1,2-bis-(α,α-difluoro-p-tolyl)tetrafluoroethane*

A solution, consisting of 35 grams of 1,2-di(p-tolyl)-tetrafluoroethane having the chemical structure

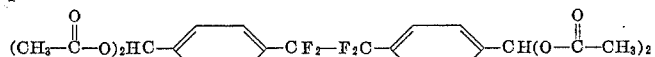

and 50 milliliters of concentrated sulfuric acid in 500 milliliters of acetic acid and 500 milliliters of acetic anhydride, was cooled to a temperature of between about 0° to 5° C. While the solution was maintained at this temperature, 66 grams of chromium trioxide was added to the solution in small amounts over a period of one hour and the solution was gently agitated by stirring for an additional two hours. The reaction mixture was then poured into ice water. The resultant product was isolated by filtration and the filter cake thoroughly washed with water and a solution of 5% sodium carbonate in water in order to remove the acids and chromic salts. While the product may be effectively washed by water alone, use of a weak basic solution, such as sodium hydroxide, potassium hydroxide and the like, materially speeds up the process. The product was next dissolved in a sufficient amount of hot ethyl acetate-methanol and permitted to recrystallize by cooling to obtain 1,2-bis(α,α-diacetoxy-p-tolyl)tetrafluoroethane which has a melting point of 177° C. and whose chemical structure is as follows:

$$(CH_3-\overset{O}{\underset{\|}{C}}-O)_2HC-\langle\phantom{x}\rangle-CF_2-F_2C-\langle\phantom{x}\rangle-CH(O-\overset{O}{\underset{\|}{C}}-CH_3)_2$$

Elemental analysis of this compound was calculated for C₂₄H₂₂F₄O₈ and was found to be as follows:

Calculated: 56.03% C, 4.31% H, 14.78% F.
Found: 56.24% C, 4.36% H, 15.16% F.

Next, 0.005 moles of the 1,2-bis(α,α-diacetoxy-p-tolyl)tetrafluoroethane was mixed with 0.1 mole of sulfur tetrafluoride and two drops of water in a 110 milliliter capacity stainless steel rocker bomb. The rocker bomb was then heated at 150° C. for a period of ten hours. The resutlant product obtained was dissolved in a sufficient amount of methylene chloride to cause it to go into solution and then thoroughly washed by agitation in a solution of water and 5% sodium carbonate in water. The methylene chloride was removed by evaporation and the resultant product dissolved in hot hexane. Recrystallization from the hexane yielded 1,2-bis,α,α-difluoro-p-tolyl)tetrafluoroethane having a melting point of 75° C. and which has the chemical structure

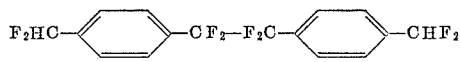

Nuclear Magnetic Resonance spectral analysis of this compound revealed peaks at 463 cycles per second and 409 cycles per second. The results of elemental analysis calculated for C₁₉H₁₀F₈ are as follows:

Calculated: 54.24% C, 2.85 H, 42.91% F.
Found: 54.16% C, 2.46% H, 43.36% F.

EXAMPLE XI

*Preparation of 1,2-bis(α-bromo-α,α-difluoro-p-tolyl) tetrafluoroethane*

A mixture consisting of 14.0 grams of 1,2-bis(α,α-difluoro-p-tolyl)tetrafluoroethane, 28.5 grams of N-bromosuccinimide and 200 milliliters of carbon tetrachloride was irradiated for about 5 days with a Hanovia mercury lamp at reflux temperature. The resultant succinimide was removed by filtration. The filtrate was next evaporated and the residue recrystallized from hexane to obtain 1,2-bis-α-bromo-α,α-difluoro-p-tolyl)tetrafluoroethane having a melting point of 125° C. and which has the chemical structure

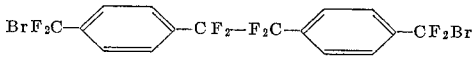

EXAMPLE XII

*Preparation of 1,2-bis(αchloro-α,α-difluoro-p-tolyl)tetrafluoroethane*

Excess gaseous chlorine in an amount of 21 grams was passed into a solution consisting of 7.08 grams 1,2-bis(α,α-difluoro-p-tolyl)tetrafluoroethane in 100 milliliters of carbon tetrachloride. As the chlorine was introduced into the solution the mixture was irradiated at reflux temperature with a Hanovia lamp, until the solution revealed an excess of chlorine as indicated by the typical chlorine-green color. The excess chlorine from the mixture was purged with a stream of argon and the solvent was then evaporated. The resultant product was dissolved in hexane, washed and recrystallized as in Example 10. Recrystallization from the hexane yielded 1,2-bis(α-chloro-α,α-difluoro-p-tolyl)tetrafluoroethane having a melting point of 135° C. and which has the chemical structure

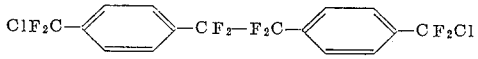

Vapor phase chromatography showed it to be greater than 99% pure. The results of elemental analysis calculated for $C_{16}H_8F_8Cl_2$ are as follows:
Calculated: 45.41% C, 1.90% H, 35.92% F, 16.76% Cl.
Found: 45.94% C, 2.01% H, 34.16% F, 18.13% Cl.

EXAMPLE XIII

*Preparation of 1,2-bis(p-trifluoromethylphenyl) tetrafluoroethane*

The following examples illustrate that the bromine-carbon bond is actually split in the bromo-difluoro methyl group having the configuration

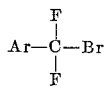

wherein Ar is an aryl group, and the bromine replaced with fluorine to form the fluorinated linear dimer.

Into a pyrolysis tube, which was heated to a temperature of 850° C., there was distilled 3.55 grams of α-bromo-α,α,α',α',α'-pentafluoro-p-xylene. The resulting pyrolysate was cooled successively with a water-cooled condenser and Dry Ice-acetone cooled receivers. From the water-cooled condenser was obtained 0.517 grams of a crystalline material while 2.0 grams of unreacted α-bromo - α,α,α',α',α' - pentafluoro-p-xylene was obtained from the Dry Ice-acetone cooled receivers. The crystalline product was then recrystallized from hexane as in Example 10. Nuclear Magnetic Resonance spectral analysis showed only one type of proton at 463 cycles per second and that the product recrystallized from hexane was 1,2 - bis(p-trifluoromethylphenyl)tetrafluoroethane having a melting point of 115° C. and which has the chemical structure

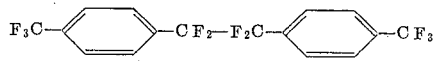

Elemental analysis, as calculated for $C_{16}H_8F_{10}$, was found to be as follows:
Calculated: 49.24% C, 2.07% H, 48.69% F.
Found: 49.01% C, 2.26% H, 48.27% F.

EXAMPLE XIV

*Pyrolysis of 1,2-bis(α-bromo-α,α-difluoro-p-tolyl)tetrafluoroethane*

A 0.2 gram sample of 1,2-bis(α-bromo-α,α-difluoro-p-tolyl)tetrafluoroethane obtained from Example XI was vaporized at 150° C. under a pressure of 0.02 mm. Hg. The vapors were then charged to a pyrolysis tube which was maintained at a temperature of 850° C.

Pyrolysis and subsequent condensation were conducted in the same manner as in Example III above to obtain a polymeric film. The polymeric film recovered was identified by comparison of infrared spectra with the products obtained in Examples III–IX hereinabove and was found to be poly(α,α,α',α'-tetrafluoro-p-xylene).

EXAMPLE XV

*Pyrolysis of 1,2-bis(α-chloro-α,α-difluoro-p-tolyl)tetrafluoroethane*

The same procedure was followed as in Example XIV above except that a 0.2 gram sample of 1,2-bis(α-chloro-α,α-difluoro-p-tolyltetrafluorethane obtained from Example XII was used. The polymeric film recovered was identified by comparison with infrared spectra as in Example XIV and found to be (α,α,α',α'-tetrafluoro-p-xylylene).

The polymers produced by the present invention have been found to exhibit excellent solvent resistance and high thermal stability. These polymers are particularly desirable in films, surface coatings, electrical insulation and other similar applications, particularly where high resistance to thermal and chemical deterioration is necessary.

For example, copper wires upon which poly(α-perfluoro-p-xylylene) has been vapor deposited provide excellent electrical conductors having an integral insulating coating thereon which is highly resistant to environmental deterioration. Moreover, when fibrous materials such as paper or cloth are impregnated with the vapor deposited polymer, the wet strength of the materials is increased. Also, the impregnated materials can now be employed in atmospheres wherein thermal and chemical deterioration would have made their prior use almost impossible, to any practical degree.

While the invention has been described in detail and with particularity, it should be understood that changes, alterations, and modifications may be made in the methods, processes, steps, and compositions described herein without departing from the scope and spirit of the invention as contained in the appended claims.

What is claimed is:

1. A process for the preparation of α-perfluoro-p-xylylene polymers which comprises pyrolyzing a compound having the general formula

wherein $n$ is an integer from 1 to 2 inclusive, Y is a halogen having a lower bond strength than that of fluorine, and Y' is a member selected from the group consisting of hydrogen and halogens having a lower bond strength than that of fluorine to form reactive intermediary diradical species having the general structure

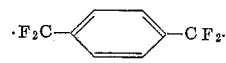

and cooling and condensing the thus formed diradicals to a temperature of below about 200° C. to form an α-perfluoro-p-xylylene polymer.

2. The process of claim 1 wherein the pyrolysis occurs at temperatures of between about 700° C. and 1000°C.

3. The process of claim 1 wherein the pyrolysis occurs at temperatures of between about 750° C. and 950° C.

4. The process of claim 1 wherein the pyrolysis is conducted at a pressure between about 0.0001 to 10 mm. Hg.

5. A process for the preparation of α-perfluoro-p-xylylene polymers which comprises pyrolyzing a compound having the general formula

wherein $n$ is an integer from 1 to 2 inclusive, Y is a halogen having a lower bond strength than that of fluorine, and Y' is a member selected from the group consisting of hydrogen and halogens having a lower bond strength than that of fluorine, at a temperature of between about 700° C. and 1000° C. and under reduced pressures of between about 0.0001 and 10 mm. Hg. to form reactive intermediary diradical species having the general structure

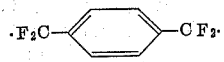

and cooling and condensing the thus formed diradicals to a temperature of below about 200° C. to form an α-perfluoro-p-xylylene polymer.

6. The process of claim 5 wherein the pyrolysis occurs at temperatures of between about 750° C. and 950° C.

References Cited by the Examiner

UNITED STATES PATENTS

| | | | |
|---|---|---|---|
| 2,238,242 | 4/1941 | Balon et al. | 260—649 |
| 2,446,464 | 8/1948 | Evans et al. | 260—488 |
| 2,453,076 | 11/1948 | Little et al. | 260—649 |
| 2,769,786 | 11/1956 | Szwarc | 260—2 |
| 2,999,820 | 9/1961 | Young | 260—2 |
| 3,021,358 | 2/1962 | Bornstein et al. | 260—488 |

OTHER REFERENCES

Auspos et al.: "Journal of Polymer Science," vol. 15, (1955), pp. 9–17.

References Cited by the Applicant

L. A. Errede and M. Szwarc: Quarterly Review 12, 201–320 (1958).

L. A. Errede, J. Org. Chem. 27, 3425–30 (1962).

S. Cohen, A. Kaluszyner and R. McChoulam: J. Am. Chem. Soc. 79, 5979–81 (1957).

H. L. Haller et al.: J. Am. Chem. Soc. 67, 1591–1602 (1945).

SAMUEL H. BLECH, *Primary Examiner.*